Sept. 20, 1971     J. A. MORROW     3,605,503
TRANSDUCER ALIGNMENT MEANS
Filed Aug. 28, 1969     2 Sheets-Sheet 1
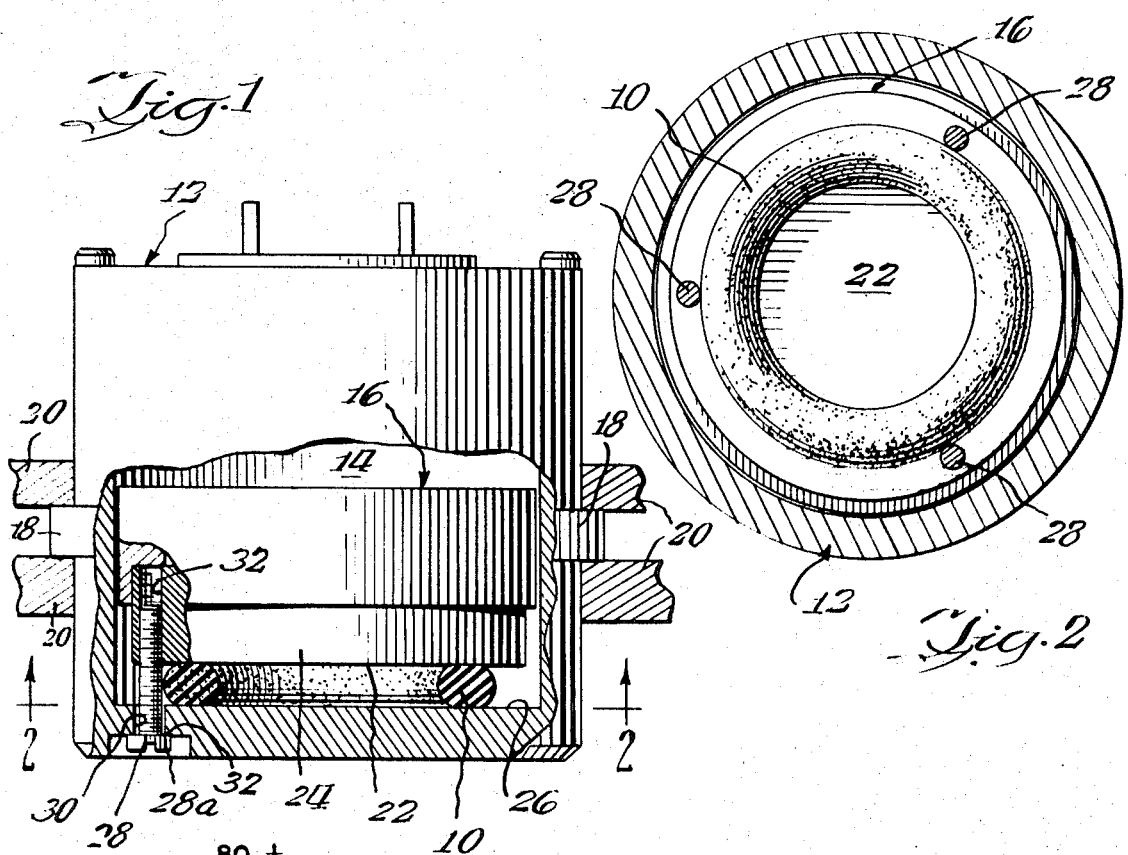
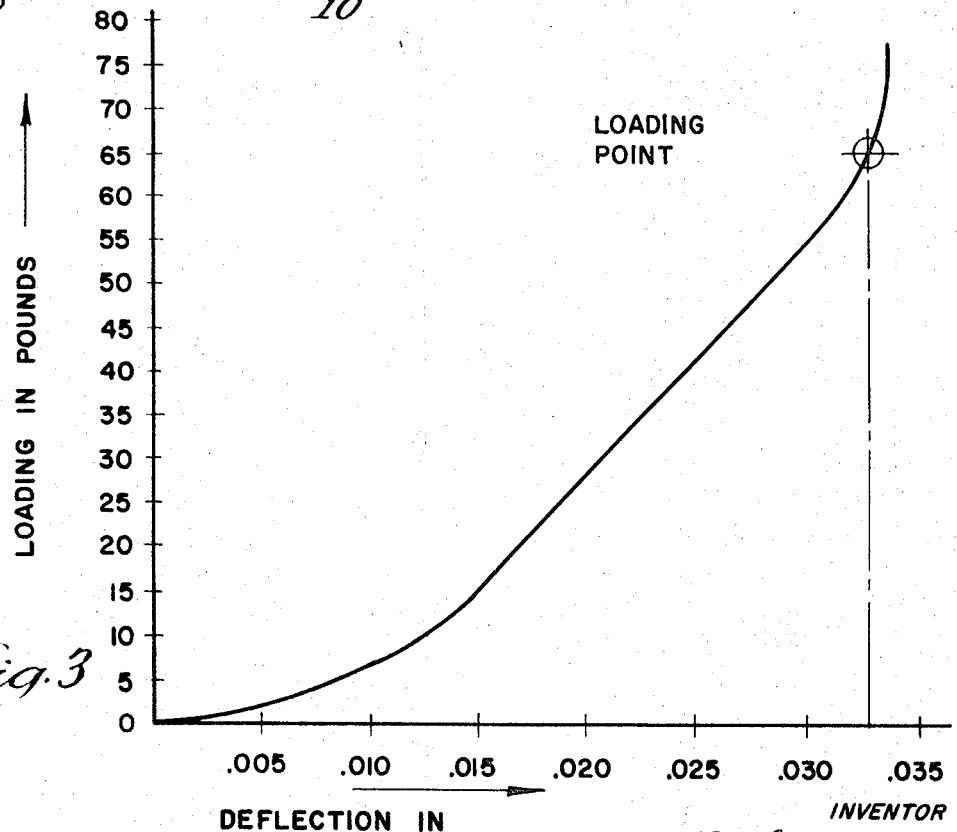
INVENTOR
Jack A. Morrow
BY Hofgren, Wegner, Allen, Stellman & McCord
ATTORNEYS

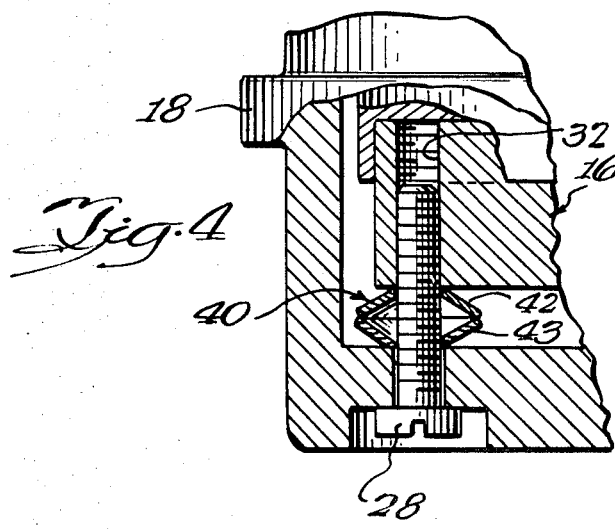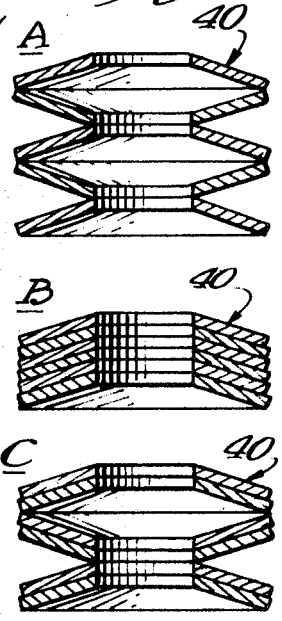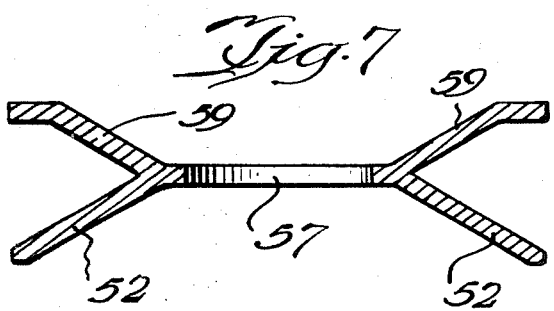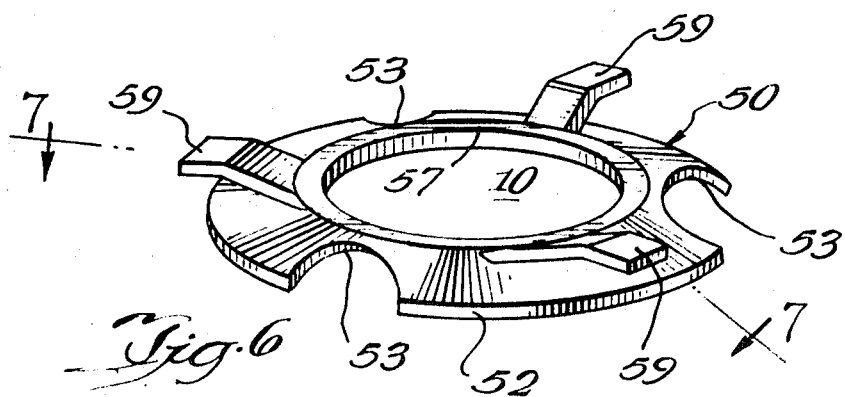

United States Patent Office 3,605,503
Patented Sept. 20, 1971

3,605,503
TRANSDUCER ALIGNMENT MEANS
Jack A. Morrow, Bellevue, Wash., assignor to
United Control Corporation
Filed Aug. 28, 1969, Ser. No. 853,805
Int. Cl. G01p 15/08
U.S. Cl. 73—517R
14 Claims

ABSTRACT OF THE DISCLOSURE

A means for aligning an accelerometer or other transducer relative to a support structure wherein the transducer and the support structure have opposed, spaced, generally planar surfaces. A resilient member is sandwiched between the surfaces and three threaded bolt members extend through openings in the support member at equally spaced points and are threaded into openings in an exterior portion of the transducer. The resilient member may be an elastic O-ring, a metallic elastic washer, or other elastic structure. Tightening of the bolt members for alignment purposes moves the transducer toward the support structure and compresses the resilient member. The opposed forces between the compressed resilient member and the tightened bolt members stabilize the transducer in its aligned position relative to the support structure.

BACKGROUND OF THE INVENTION

Accelerometers for aircraft and the like (the discussion herein will relate to known servoed type accelerometers) have to be "calibrated" or aligned with the framework of the aircraft so as not to give an output when the aircraft is in a prescribed orientation. Heretofore, the various mating surfaces between the framework of the aircraft, the housing or support structure for the accelerometer and the accelerometer structure itself had metal-to-metal contact and the alignment was accomplished by machining the surfaces to close and very expensively attained tolerances. This invention is designed to eliminate many of the problems inherent in such prior structures.

SUMMARY OF THE INVENTION

This invention relates to means for adjusting the alignment of accelerometers or other transducers or the like relative to a supporting structure, for use in aircraft and the like.

Another object of this invention is to provide a combination which includes a transducer unit having an outer casing and means defining a generally planar surface on an exterior portion of the casing. The transducer includes a seismic element mounted for movement relative to a support structure and means are provided defining a generally planar surface on an interior portion of the support structure spaced from and facing the planar surface of the casing. A resilient member is sandwiched between the planar surfaces to resist movement of the transducer toward the casing. Three bolt members are loosely received in openings in the casing at points spaced 120° apart about the resilient member and threaded into bores in the support structure. The bolts are disposed generally perpendicular to said planar surfaces and have head portions abutting the casing about the openings therein to draw the transducer toward the casing on tightening of the bolts, for alignment purposes. The opposed forces exerted by the resilient member, in the form of an elastic O-ring, a metalic elastic washer, or other elastic structure, and the tightened bolts stabilize the transducer in its aligned position relative to the casing. The casing has a mounting bracket which mates with bracket members on the framework of the aircraft. The mounting bracket on the transducer is rigidly fixed relative to its planar surface such that alignment of the transducer relative to the support structure insures alignment of the transducer relative to the framework of the aircraft.

Other objects, features and advantages of the invention will become apparent from the following detailed description taken in connection with the accompanying drawings.

DESCRIPTION OF THE DRAWINGS

FIG. 1 is an elevational view of an accelerometer and support structure embodying the invention and using an O-ring for the resilient member, with portions of the view cut away and in section to facilitate the illustration;

FIG. 2 is a section taken generally along the line 2—2 of FIG. 1;

FIG. 3 is a graph showing a typical loading characteristic of the O-ring having 80 durometer of hardness;

FIG. 4 is a sectional view of a portion of FIG. 1 and illustrating the use of an elastic washer in place of the O-ring of FIG. 1;

FIGS. 5A–C are elevational views of different embodiments for the elastic washer shown in FIG. 4;

FIG. 6 is a perspective view of yet another embodiment of the resilient member, which may replace the O-ring of FIG. 1; and FIG. 7 is a sectional view taken along lines 7—7 of FIG. 6.

DETAILED DESCRIPTION OF THE INVENTION

The invention is shown herein as incorporated in an accelerometer used in aircraft and the like, and particularly to known pendulum type accelerometers. However, it should be understod that the invention has utility with any type of transducer or similar component which has to be aligned relative to a directional frame of reference.

A main element of the present invention is a resilient member 10 which is sandwiched between a pair of generally planar surfaces, to be described hereinafter. The resilient member may be fabricated of any "compressible" material such as metal, plastic or rubber. The illustrated embodiment in FIGS. 1–3 incorporates a rubber O-ring having 80 durometer of hardness. It is recognized that rubber is not a "compressible" material within the literal meaning of the term, but the use of the term "compressible" herein is intended to be in the context of the degree or amount by which the O-ring is deflected or flattened in a direction normal to the aforementioned surfaces, between which the O-ring is sandwiched, as the O-ring is distorted by pressure applied by the surfaces. In the remaining figures, other specific embodiments for resilient member 10 are described in detail.

Referring to FIGS. 1 and 2, a support structure in the form of a generally hollow housing, generally designated 12, is provided with an interior cavity 14 within which is mounted an accelerometer, generally designated 16. The following application of the invention will be with known pendulum type or other accelerometers having a seismic element (not illustrated) located within 16 for relative movement. The supporting structure or housing 12 has a mounting bracket portion 18 rigidly fixed thereto and which mates with a pair of bracket members 20 on the framework of an aircraft or the like, not shown in the drawings. It should be understood that the bracket members 20 of the aircraft are calibrated with respect to the body of the aircraft and are rigidly attached to the mounting bracket 18 of the housing 12 such that alignment of the accelerometer 16 relative to the housing 12 and the mounting bracket 18 will, in turn, align the accelerometer 16 with the bracket members 20 of the framework of the aircraft, and thus the aircraft itself.

The resilient member or O-ring 10 is sandwiched between a first surface 22 on the exterior or underside of a casing portion 24 of the accelerometer 16 and a second surface 26 on the interior of the housing 12. The surfaces 22 and 26 are generally planar and spaced from each other to accommodate the O-ring. Three threaded bolt members 28 are spaced about the O-ring 10 approximately 120° apart and extend generally perpendicular to the surfaces 22 and 26. The bolt members are loosely received in openings 30 (FIG. 1) in the base of the housing 12 with the heads 28a of the bolt members countersunk within the base of the housing and abutting against shoulders 32 surrounding the openings 30. The inner end of the bolts 28 are threaded into bores 32 in the casing portion 24 of the accelerometer 16. It is readily apparent that tightening of the bolts 28 causes the accelerometer 16 to move downwardly relative to the housing 12 in a direction to move the surfaces 22 and 26 toward each other against the resistance of the resilient O-ring 10.

With the bracket members 20 fixed relative to the framework of the aircraft; with the bracket portion 18 fixed to the housing 12 and rigidly attached to the bracket members 20; and with the surface 26 forming an integral part of the housing 12, adjustment and alignment of the accelerometer 16 relative to the surface 26 correspondingly adjusts and aligns the accelerometer relative to the aircraft itself. As the bolts 28 are tightened to align the accelerometer, thereby moving the accelerometer 16 relative to the housing 12 and the surfaces 22 and 26 toward each other, the O-ring 10 is compressed. The opposed forces exerted by the O-ring 10 and the tightened bolts 28 stabilize the accelerometer in its aligned or adjusted position.

FIG. 3 shows a graph which compares the loading in pounds versus the deflection in inches of a rubber O-ring having 80 durometer of hardness. Of course, the shape of the graph will depend upon the material used for the O-ring and its relative compressibility. While rubber is disclosed, other materials can be used, including materials with other characteristics, as a bulk compressible material. As seen in the graph, the loading exerted by the bolts 28 and the deflection or compressibility of the rubber O-ring (80 durometer) increases generally proportionately up to approximately 65 pounds of loading. It can be seen that beyond 65 pounds, the O-ring reaches what can be called a "limit of compressibility" beyond which increased force by the bolt members 28 cannot further compress the O-ring. In actual practice, if the loading continues to increase, either the threads on the bolt 28 will strip or the rubber O-ring will completely break apart.

Although prior devices which use surface-to-surface contacts which are aligned by expensive manufacturing tolerances might superficially appear to provide a more rigid and stabilized structure, FIG. 3 graphically illustrates that by utilizing the means disclosed herein an extremely rigid and stabilized structure is provided when the O-ring is loaded to a point slightly below its limit of compressibility. In the graph, this is labeled the "loading point" and is reached at approximately 65 pounds of loading for an 80 durometer rubber O-ring which has an outer diameter of ¾ inch and a cross-sectional diameter of .100 inch. The accelerometer 16 has a maximum weight of typically 30 grams. Since the maximum force to which the accelerometer is subjected will not exceed 100 G's or the like, the maximum effective weight of the accelerometer is on the order of six pounds. It will be apparent that such effective weight is at least an order of magnitude below the 65 pounds loading point of the O-ring, hence the tendency of the O-ring to expand is far in excess of the weight of the accelerometer, maintaining the alignment determined by the bolt members 28.

In operation or adjustment of the device of this invention, the housing 12, accelerometer 16, O-ring 10 and bolt members 28 are assembled and the bolts are tightened to the "loading point" or where the O-ring very closely approaches its limit of compressibility. With normal manufacturing tolerances, the accelerometer will be quite close to its properly aligned position when the "loading point" is reached. The housed accelerometer is then placed into a jig which simulates the bracket members 20 of the aircraft framework and the accelerometer is connected to a testing indicator. The jig then is rotated in a prescribed plane so as to test the accelerometer which, in a known manner, gives an output if not properly aligned. One or two of the bolts 28 are then tightened slightly to bring the accelerometer into final alignment and the unit is ready to be mounted on the bracket members 20 of an aircraft framework. Thus the alignment is accomplished by bolts 28 which maintain metal-to-metal contact between accelerometer 16 and the casing 12, which in turn is in metal-to-metal contact with the air frame 20. The purpose of O-ring 16 is only to maintain the metal-to-metal contact which rigidly defines the alignment position. Therefore, it is only necessary that the O-ring should expand against its constraints with a force which will always keep it in contact with these constraints under the heaviest environmental condition of shock or vibration, and that the force shall not be so great that the constraining means shall undergo deformation or failure.

In the remaining figures, other forms of resilient member 10 are illustrated, which can replace the O-ring embodiment specifically disclosed with reference to FIGS. 1–3. It should be noted that the resilient member need not be linear over a large portion of its working range of deflection as was true for the O-ring, see FIG. 3. In addition, it is not necessary that the force applied by the member being compressed be constant with time or other environmental factors such as temperature. Such flexibility results because the resilient member 10 does not accomplish alignment in itself, but only supplies the force which maintains the transducer means in metal-to-metal contact against the constraint of the bolts 28.

In FIG. 4, resilient member 10 is in the form of an elastic washer or spring 40, commonly known as a "Belleville" washer, one associated with each of the bolts 40. Each spring 40 has a center aperture through which the corresponding bolt 28 extends. Thus, three springs 40 replace the O-ring shown in FIGS. 1 and 2. In FIG. 4, the spring 40 consists of a pair of sections 42 and 43 stacked in series. Depending upon the degree of loading which must be provided by the springs 40, additional spring sections may be stacked in known series and parallel arrangements to supply sufficient loading in accordance with the teachings previously described.

In FIG. 5, some additional elastic springs 40 of the "Belleville" type are shown, which may replace the spring 40 shown in FIG. 4 when additional loading is desired. In FIG. 5A, the spring 40 consists of five stacked sections placed in series. In FIG. 5B, six sections are placed in parallel, and in FIG. 5C, three sections are placed in series and two in parallel. The load deflection curves of the springs 40 vary from a substantially linear shape, to sloping curves, depending on the exact spring configuration. Because the purpose of the springs 40 is to apply compression forces, rather than themselves accomplish alignment, the springs 40 may be loaded along any portion of the load deflection curve of the spring, such as the positive, negative or zero slope portion, provided that the force level always lies between the maximum and minimum limits of compression.

Springs 40 shown in FIGS. 4 and 5 are usually non-linear elements. A linear spring means can be used in place of the three springs, as is illustrated in FIGS. 6 and 7. In these later figures, elastic member 10 is in the form of a single metallic, machined member 50 having a diameter generally corresponding to the diameter of the O-ring, FIG. 2, and which replaces the O-ring. The member 50 includes a skirt portion 52 having concave sections 53 cut out of the skirt 52. Each concave section 53 is placed adjacent a corresponding bolt 28, see FIG. 2, with the cut away portion allowing the bolt 28 to pass therethrough. Integral with the radially inner portion of skirt 52 is a neck portion 57 which includes a plurality of radially and axially extending legs 59. The legs 59 abut the first surface 22 of the accelerometer, see FIG. 1, while the axially bottom-most portion of the skirt 52 abuts the second surface 26 of the casing. As the bolts 28 are tightened, machined member 50 will act in a manner similar to the other described embodiments of the resilient member, that is, will compress and supply a force sufficient to maintain the alignment position selected by threading of bolts 28.

The foregoing detailed description has been given for clearness of understanding only and no unnecessary limitations should be understood therefrom as some modifications will be obvious to those skilled in the art.

I claim:

1. In a measurement system including a transducer having a sensitive element mounted with a predetermined relation to a first surface to measure an external force, said transducer being mountable to a support structure having a second surface, alignment means for aligning the sensitive element relative to the support structure and for maintaining said surfaces substantially fixed during the occurrence of said external force, comprising:
  a resilient member disposed between said surfaces to resist movement of the surfaces toward each other, said resilient member producing a resistance to movement in excess of the effective weight of said transducer during the occurrence of said external force; and
  adjustment means for moving said surfaces toward each other with sufficient force to overcome the resistance of said resilient member, whereby the opposed forces of said resilient member and said adjustment means stabilize the transducer in its aligned position during the occurrence of said external force.

2. The alignment means of claim 1 wherein said adjustment means comprises a plurality of spaced, threaded bolt members, each of said bolt members being mounted on either said transducer or said support structure for free rotational movement relative thereto, and each of said bolt members being threaded into bores in the other of said transducer or said support structure to draw said surfaces toward each other compressing the resilient member.

3. The alignment means of claim 1 wherein said surfaces are generally planar and said resilient member comprises an O-ring shaped member sandwiched between the planar surfaces.

4. The alignment means of claim 3 wherein said O-ring member is formed of rubber material having a durometer hardness capable of producing a desired loading at least an order of magnitude greater than the effective weight of said transducer during the occurrence of said external force, and said adjustment means being adjusted to produce said desired loading.

5. The alignment means of claim 1 wherein said surfaces are generally planar and said resilient member comprises elastic spring means having a plurality of stacked sections sandwiched between the planar surfaces.

6. The alignment means of claim 5 wherein said adjustment means comprises a plurality of spaced, threaded bolt members, and said resilient member comprised of said plurality of stacked sections has one section associated with each of said bolt members for resisting movement of said surfaces toward each other.

7. The alignment means of claim 1 wherein said surfaces are generally planar and said resilient member comprises a metallic member sandwiched between the planar surfaces, said metallic member including opposed going sections adjacent each of said planar surfaces and shaped for elastic movement when said opposite going sections are compressed relative to each other.

8. The alignment means of claim 1 wherein said resilient member is formed to be generally compressible to produce when compressed an expansion force at least a plurality of times greater than the effective weight of said transducer during the occurrence of said external force.

9. The alignment means of claim 8 wherein said expansion force is at least ten times greater than said effective weight.

10. In a measurement system including a transducer unit having a seismic element movable relative to a frame to measure an external force and means defining a first surface on an exterior portion of the frame, a support structure within which said transducer unit is housed for alignment relative to the support structure, said support structure having means defining a second surface on an interior portion thereof spaced from and facing said first surface, alignment means for aligning said seismic element relative to said support structure and for maintaining said surfaces substantially fixed during the occurrence of said external force, comprising:
  a resilient member disposed between said first and second surfaces to resist movement of the surfaces toward each other, said resilient member producing a resistance to movement in excess of the effective weight of said transducer unit during the occurrence of said external force; and
  a plurality of bolt members loosely received in openings in either one of said transducer unit or said support structure and threaded into bores in the other of said transducer unit or said support structure, said bolts being disposed generally perpendicular to said surfaces and having head portions abutting said one of said transducer unit or said support structure to draw the surfaces toward each other with sufficient force to overcome the resistance of said resilient member on tightening the bolts to align the transducer unit, whereby the opposed forces exerted by said resilient member and the tightened bolts stabilize the transducer unit in its aligned position during the occurrence of said external force.

11. The alignment means of claim 10 wherein said resilient member is formed of metal having at least first and second portions arranged for resilient movement therebetween, said first and second portions being adjacent said first and second surfaces respectively.

12. The alignment means of claim 10 wherein said plurality of bolt members comprise three bolt members located along a circle and each spaced approximately 120° apart from the remaining bolt members.

13. The alignment means of claim 10 wherein said support structure has a mounting means for securing the support structure to a framework of a vehicle, said mounting means being rigidly fixed relative to said second surface such that adjustment of the alignment of said surfaces adjusts the alignment of the transducer unit relative to the framework of the vehicle.

14. The alignment means of claim 10 wherein said resilient member is formed of a generally elastic material capable of being compressed to produce an expansion force a plurality of times greater than the effective weight of said transducer unit during the occurrence of said external force.

References Cited

UNITED STATES PATENTS

| | | | |
|---|---|---|---|
| 928,557 | 7/1909 | Sobotka | 33—70 |
| 994,903 | 6/1911 | Berger | 33—73 |
| 2,316,915 | 4/1943 | Truman | 73—382 |
| 2,970,381 | 2/1961 | Pierce | 33—207 |
| 3,152,485 | 10/1964 | Lones et al. | 73—517 |
| 3,295,355 | 1/1967 | Fisher et al. | 73—1 |
| 3,462,998 | 8/1969 | Elder | 73—71.2 |

RICHARD C. QUEISSER, Primary Examiner

H. GOLDSTEIN, Assistant Examiner

U.S. Cl. X.R.

73—432A